US011787531B2

(12) United States Patent
Vogel et al.

(10) Patent No.: US 11,787,531 B2
(45) Date of Patent: Oct. 17, 2023

(54) MODULAR LOAD CARRYING APPARATUS WITH A CARRIER STAR

(71) Applicant: AIRBUS HELICOPTERS DEUTSCHLAND GMBH, Donauworth (DE)

(72) Inventors: Dominik Vogel, Langweid (DE); Alexandru Dinca, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 89 days.

(21) Appl. No.: 17/666,260

(22) Filed: Feb. 7, 2022

(65) Prior Publication Data

US 2022/0388657 A1    Dec. 8, 2022

(30) Foreign Application Priority Data

Jun. 8, 2021   (EP) ..................................... 21400012

(51) Int. Cl.
   *B64C 27/04*   (2006.01)
   *B64D 1/08*    (2006.01)

(52) U.S. Cl.
   CPC ................ *B64C 27/04* (2013.01); *B64D 1/08* (2013.01)

(58) Field of Classification Search
   CPC .. B64D 1/08; B64D 1/22; B64C 27/04; B64U 2101/60; B64U 2101/64; B64U 2101/66; B64U 2101/67; B63B 22/04; B63B 21/00; B63H 25/00
   See application file for complete search history.

(56) References Cited

U.S. PATENT DOCUMENTS

| | | | |
|---|---|---|---|
| 3,444,569 A | 5/1969 | Greenberg et al. | |
| 3,467,346 A | 9/1969 | Carson | |
| 3,476,339 A | 11/1969 | Pugh | |
| 6,189,834 B1 * | 2/2001 | Dietz | B66C 1/16 244/137.4 |
| 6,598,831 B1 | 7/2003 | Tardy | |

(Continued)

FOREIGN PATENT DOCUMENTS

| | | |
|---|---|---|
| EP | 1100720 A1 | 5/2001 |
| EP | 1646562 A1 | 4/2006 |

(Continued)

OTHER PUBLICATIONS

European Search Report for European Application No. EP 21400012.7, Completed by the European Patent Office, dated Nov. 11, 2021, 6 pages.

*Primary Examiner* — Tien Q Dinh
*Assistant Examiner* — Katherine June Bolek
(74) *Attorney, Agent, or Firm* — BROOKS KUSHMAN P.C.

(57) ABSTRACT

A modular load carrying apparatus for a rotary wing aircraft and to a rotary wing aircraft with such a modular load carrying apparatus. The modular load carrying apparatus may include a tube, first and second caps at first and second axial ends of the tube, a carrier star with docking devices that are adapted for rotatably receiving a seat or a carrier beam that may be folded against the tube in a stowed position or unfolded from the tube in a deployed position. A tension rod may be spanned between the first and second caps and transfer tension loads from the carrier star via the second cap towards the first cap.

15 Claims, 9 Drawing Sheets

(56) References Cited

U.S. PATENT DOCUMENTS

2005/0250396 A1 11/2005 Hayles
2006/0249330 A1 11/2006 Tardy

FOREIGN PATENT DOCUMENTS

| RU | 2563291 C1 | 9/2015 |
| WO | 0007877 A1 | 2/2000 |
| WO | 2005005253 A1 | 1/2005 |
| WO | 201991669 A1 | 5/2019 |

* cited by examiner

MODULAR LOAD CARRYING APPARATUS WITH A CARRIER STAR

CROSS-REFERENCE TO RELATED APPLICATIONS

This application claims priority to European patent application No. EP 21400012.7 filed on Jun. 8, 2021, the disclosure of which is incorporated in its entirety by reference herein.

TECHNICAL FIELD

The present embodiments relate to a modular load carrying apparatus and, more particularly, to a modular load carrying apparatus for a rotary wing aircraft. The present embodiments further relate to a rotary wing aircraft, with such a modular load carrying apparatus.

BACKGROUND

Aircrafts and, more particularly, rotary wing aircrafts such as e.g., helicopters are commonly used to perform aerial transportation and delivery tasks, including passenger transport, disaster relief, or carrying all kind of external loads. By way of example, rotary wing aircrafts are used to transport and deliver loads to mountainous regions in general and, more specifically, to mountainous regions where no roads exist or where roads cannot be used for transportation and delivery, e.g., due to extreme weather conditions in winter and so on.

Furthermore, rotary wing aircrafts are used for transportation and delivery of external loads such as passengers and equipment in the military sector or for rescue missions. In order to enable a rotary wing aircraft for transportation of an external load, the rotary wing aircraft is usually equipped with a hoist or lift mechanism.

Conventionally, such a hoist or lift mechanism has a boom that is secured to the fuselage of the aircraft with an external system. The hoist may include a winch mechanism that is fixed to the boom and a rope or cable attached to the winch mechanism so as to be unwound from or wound into the winch mechanism to respectively descend or ascend.

In many rotary wing aircrafts, the hoist mechanism is located above an access opening provided in the fuselage. This access opening allows people or objects to enter and exit the fuselage. Depending on the requirements of the mission and on the architecture of these rotary wing aircrafts, the opening access may be a side door, a rear door, a movable panel, or the like. Alternatively, a cargo hook arrangement may be installed underneath the rotary wing aircraft, and the opening access may be a floor trap.

Generally, a load carrying apparatus is secured to the rope or cable and suspended from the rotary wing aircraft by means of the rope or cable. Thus, people and/or objects can be transported by the rotary wing aircraft while being carried by the load carrying apparatus.

Document WO 2019/91669 A1 describes a pod for transporting people between a barge and an oil platform, comprising a central pole and a plurality of arms, one end of each arm being mounted in an articulated manner on the central pole between a storage position in which each arm extends substantially parallel to the central pole, and a use position in which each arm extends substantially orthogonal to the central pole so as to form a support base onto which people can climb in a standing position, the central pole further comprising, at the head of same, a peripheral gripping member suitable for being gripped by the people during the journey.

Document US 2005/0250396 A1 describes a compact rescue lift device adapted to be deployed from an elevated location, having a central spine with upper and lower portions, where the upper portion of the spine includes a means for coupling the device to a structure and the lower portion includes a plurality of seating surfaces which include both supporting and retaining portions, with the device also including a plurality of hand grips, where the device is adapted to carry multiple victims at a time.

Document EP 1 646 562 A1 (US 2006/0249330 A1) describes a pod comprising a central pole having a support section which bears the ends of pivot-mounted arms. When retracted against the pole, opposing free sections of the arms are held in place by a removable locking device comprising an axially-mobile crown element which locks the arms in a radial manner. The aforementioned crown element is held in the locked position by means of a hysteresis effect. In this way, with the release of a compressed spring, the crown element can only be moved backwards out of the hold when the spring is additionally compressed by an external force, such as to release a mobile end stop element which impedes the action of the spring, and the backstop element is maintained in delicate equilibrium by the crown element.

Document EP 1 100 720 A1 (U.S. Pat. No. 6,598,831 B1) describes a device suspended to a carrier for rescuing people or equipment comprising a link between the carrier and a pod capable of being folded and unfolded formed by a frame associated with a flexible support. The frame comprises, fixed to the link, a central mast connected to mobile means bearing the flexible support, for folding and unfolding the mobile means and the flexible support about the central mast.

Document U.S. Pat. No. 3,476,339 A describes a device for lifting an individual from an area enshrouded with foliage, comprising: an upper inverted cup-shaped casing, a lower cup-shaped casing, collapsed telescoping tubular members joining said casings, a plurality of elongated sheet material elements pivotally mounted at their upper ends on the upper casing surrounding said tubular members with lower ends, of said elements extending within the upper portion of said lower casing, releasable means including a detent maintaining said tubular members in said collapsed position and the casings in positions retaining said elements within the cross-sectional areas of the casings whereby the device in a compact condition may move by gravity downwardly through foliage, said tubular members being extensible upon release of said detent whereby the casings may be moved away from each other, a seat member shiftable to a position substantially at right angles to said tubular members, and means for moving the sheet material elements to extended positions forming a canopy over said seat member to deflect foliage from an individual supported on said sheet member.

Document U.S. Pat. No. 3,467,346 A describes an air-ground rescue device for use with a cable suspended from a hovering aircraft, said device comprising seat defining means carried at the lower end of the cable, a protective shield assembly removably mounted to the cable above said seat defining means, said shield assembly including a cap having a laterally open side slot for receiving the suspended cable, at least two panels hingedly connected to said cap for movement toward and away from stowed positions wherein their corresponding side edges are arranged contiguous to one another.

Document U.S. Pat. No. 3,444,569 A describes an air-sea rescue device for use with a cable suspended from a hovering aircraft, said device comprising a shank portion having an upper end adapted for connection to a cable as aforesaid, and also having a lower end, at least one seat pivotally connected to said lower end for movement between a stowed position alongside said shank portion and a deployed position wherein said seat extends laterally outwardly at substantially 90 degrees with respect to said shank portion, a flotation collar for said shank portion to float the device when immersed in water, strap means associated with said shank upper end portion for securing a person to be rescued on said deployed seat, means for stowing said strap means to said shank upper end portion, said flotation collar being annular in cross section and extending from the lower end of said shank portion to a point spaced below the upper end thereof to permit ready removal of said stowed strap means without interfering with said collar.

However, all prior art documents lack a load carrying apparatus that is configurable with a seat-type and a net-type platform. Furthermore, any platform with foldable arms or seats uses straps or similar means that secure the foldable arms or seats in the deployed position. Moreover, all seat-type platforms lack means for preventing the arms or seats from rotating back from the unfolded position to a folded position. Document RU2563291 is also known.

SUMMARY

Based on the limitations and drawbacks of the prior art, an objective is to provide a modular load carrying apparatus for carrying a load with a rotary wing aircraft. The modular load carrying apparatus should be adapted for enabling interchangeable platforms. These platforms should be lightweight, configurable, easy to install and to remove, and be foldable. Furthermore, the platforms should avoid the use of straps with which any equipment could become entangled.

This objective is solved by a modular load carrying apparatus comprising the features of claim 1. More specifically, a modular load carrying apparatus for a rotary wing aircraft comprises a tube that has a first predetermined outer diameter and first and second axial ends; a first cap that is located inside the tube at the first axial end and adapted for being connected with the rotary wing aircraft; a second cap that is located inside the tube at the second axial end and comprises a protrusion that protrudes from the second axial end and has a second predetermined outer diameter that is greater than the first predetermined outer diameter; a carrier star that is installed at the second axial end of the tube and comprises a plurality of docking devices, wherein each docking device of the plurality of docking devices is adapted for rotatably receiving at least one of a seat or a carrier beam such that the at least one of a seat or a carrier beam is folded against the tube in a stowed position or unfolded from the tube in a deployed position; and a tension rod that is spanned between the first cap and the second cap and transfers tension loads from the carrier star via the second cap towards the first cap.

The inventive modular load carrying apparatus with interchangeable platforms complies with the latest amendments of the Federal Acquisition Regulation (FAR) requirements and military standards.

The whole weight of the net-type and seat-type platforms is very low because just the net assembly and the seat assembly are exchanged and all the other parts of the modular load carrying apparatus such as, for example, the tube and the docking ring can be used for both configurations.

The operational benefit of the modular load carrying apparatus with configurable platforms is significant. As an example, several people can be brought inside a rotary wing aircraft such as a helicopter (e.g., with the seat-type platform) at the same time. As another example, several people and equipment or cargo can be transported outside a helicopter (e.g., with the net-type platform).

The modular load carrying apparatus with the net-type platform is adapted to the operational size of a special forces team in terms of volume or weight. In contrast thereto, conventional load carrying apparatuses are usually oversized.

Due to the large diameter of the tube, the required floatability of the modular load carrying apparatus on water may be achieved without additional floats. Placing a load carrying rod inside the tube may decouple the tension from bending loads and reduce the forces on the tube.

Contrary to conventional load carrying apparatuses, no connecting or suspension ropes are attached between the tube and the carrier beams of the platforms. Instead, the forces and moments are transferred from the carrier beams directly into the carrier star. As a result, tripping hazards are eliminated and the segmentation of the areas is avoided, which may enable the faster execution of missions.

The modular load carrying apparatus provides for redundant securing means. In fact, transported people and/or equipment may be secured to the tube and to the docking ring, which leads to an increase in safety.

The modular load carrying apparatus may quickly be changed from a seat-type platform to a net-type platform and vice versa. A single person without tools may perform this change in configuration.

The carrier beams of the net-type platform provide stable support for sitting and/or standing compared to state-of-the-art products, where small tubes are installed and standing or sitting is only possible on the net.

The modular load carrying apparatus may be used for airborne external transport of people and cargo on rotary wing aircrafts such as helicopters. Depending on the planned mission, the desired platform type (e.g., a seat-type or net-type platform) may be mounted to the modular load carrying apparatus in a short time.

Integrated safety lugs on a docking ring may be used to secure people and/or cargo. A carrier arm of the seat-type or net-type platforms can be fixed in an unfolded position with a carrier locking device. Due to the carrier locking devices, the respective platforms may be able to stand safely on the ground without tipping over.

According to one aspect, the carrier star has a first predetermined inner diameter that is greater than the first predetermined outer diameter and smaller than the second predetermined outer diameter such that the carrier star is adapted for being slidable over the first axial end of the tube and restrained by the second cap.

According to one aspect, the modular load carrying apparatus further comprises removable upholstery that covers the outside of the tube.

According to one aspect, the modular load carrying apparatus further comprises at least one securing fastener that is attached to the removable upholstery and adapted for securing the at least one of a seat or a carrier beam in the stowed position.

According to one aspect, the modular load carrying apparatus further comprises platform fasteners that are adapted for securing the carrier star to the tube and to the second cap.

According to one aspect, each docking device of the plurality of docking devices further comprises a counter bracket that supports the at least one of a seat or a carrier beam in the deployed position.

According to one aspect, each docking device of the plurality of docking devices further comprises a carrier locking device that locks the at least one of a seat or a carrier beam in the deployed position.

According to one aspect, the carrier locking device further comprises a recess that form fits a locking edge of the at least one of a seat or a carrier beam.

According to one aspect, the carrier locking device further comprises a spring that pre-loads the carrier locking device such that the recess remains engaged with the locking edge of the at least one of a seat or a carrier beam when the at least one of a seat or a carrier beam is in the deployed position.

According to one aspect, the carrier locking device further comprises a handle for disengaging the recess from the locking edge of the at least one of a seat or a carrier beam.

According to one aspect, each one of the at least one of a seat or a carrier beam further comprises a ground support, wherein the at least one of a seat or a carrier beam is adapted for standing on the ground support when the at least one of a seat or a carrier beam is in the deployed position.

According to one aspect, the at least one of a seat or a carrier beam further comprises at least two seats that are rotatably attached to the plurality of docking devices of the carrier star to form a seat-type platform.

According to one aspect, the at least one of a seat or a carrier beam further comprises at least three carrier beams that are rotatably attached to the plurality of docking devices of the carrier star; and nets that are spanned between the at least three carrier beams to form a net-type platform.

According to one aspect, the modular load carrying apparatus further comprises a removable cover that is installed at the first axial end of the tube and comprises a plurality of safety lugs that are adapted for securing a load.

Furthermore, a rotary wing aircraft may comprise at least one of a hoist or a cargo hook arrangement; and the modular load carrying apparatus described above, wherein the first cap is removably attached to the at least one of a hoist or a cargo hook arrangement.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1A:
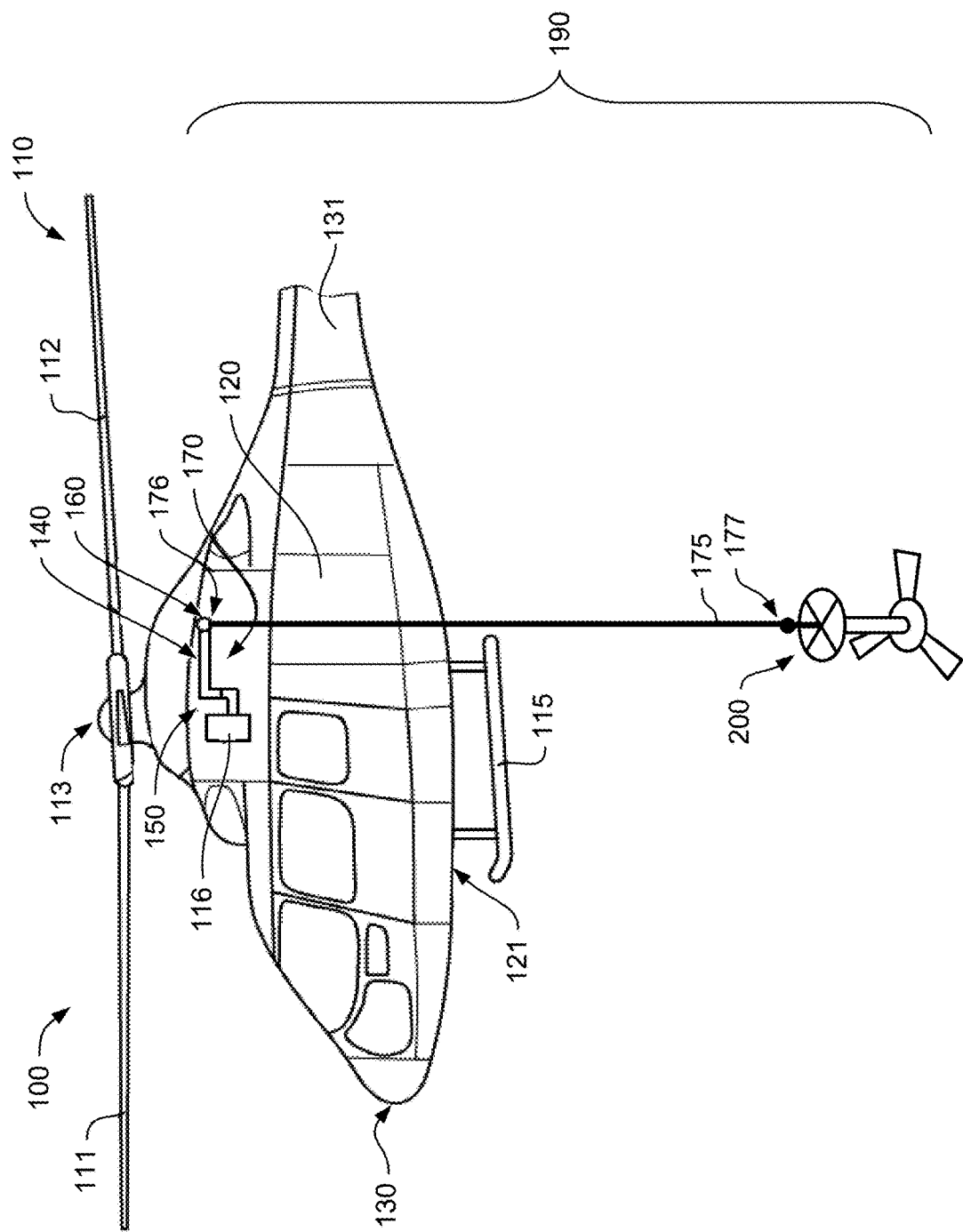
FIG. 1A is a diagram of an illustrative rotary wing aircraft with a modular load carrying apparatus that is attached to a hoist mechanism located above an access opening in the fuselage in accordance with some embodiments.
Figure 1B:
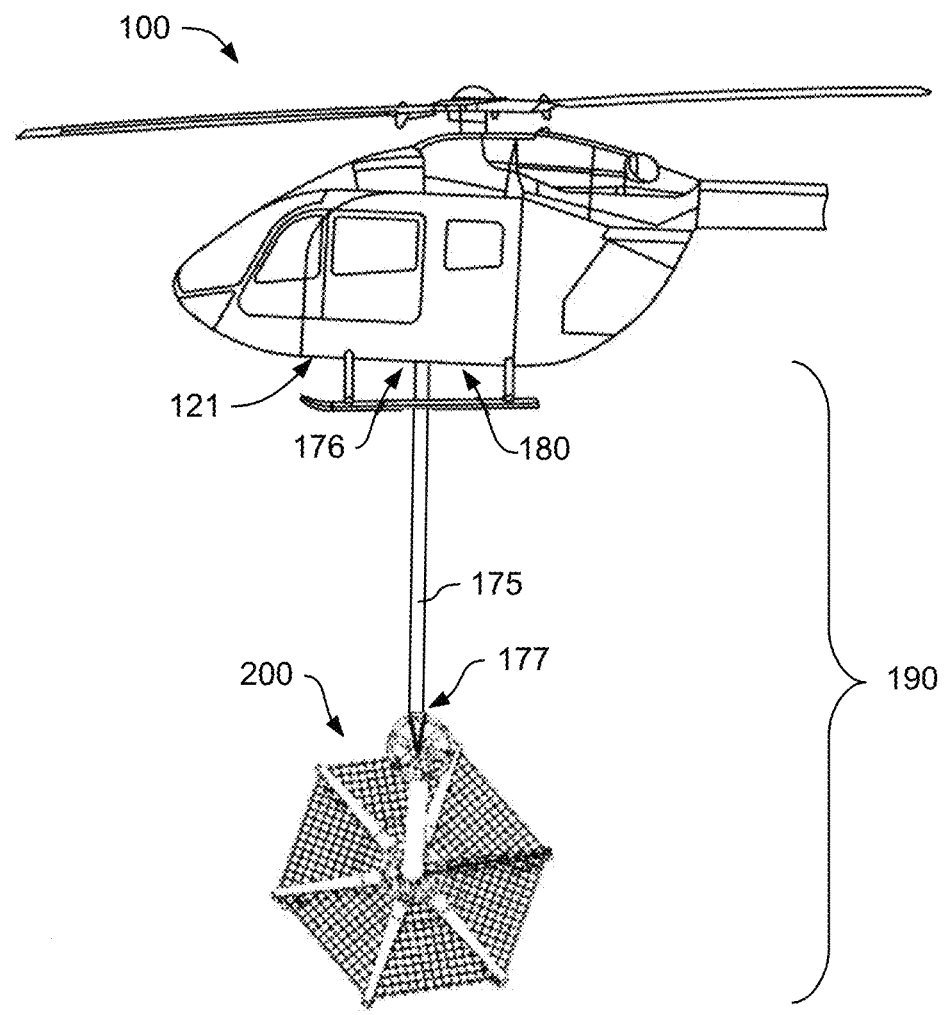
FIG. 1B is a diagram of an illustrative rotary wing aircraft with a modular load carrying apparatus that is attached to a cargo hook arrangement located at the underside of the fuselage in accordance with some embodiments.

Exemplary embodiments may be included in any rotary wing aircraft that is adapted for vertical take-off and landing. FIG. 1A and FIG. 1B show an example of a rotary wing aircraft 100. The rotary wing aircraft may be a multicopter, a drone, or any other rotorcraft such as tiltable-wing, fixed-wing, or wingless aircraft. Aircraft 100 is exemplarily illustrated as a helicopter. Thus, for purposes of simplicity and clarity, aircraft 100 is hereinafter referred to as "helicopter" 100.

As shown in FIG. 1A, the helicopter 100 is exemplarily embodied with a fuselage 120 and at least one multi-blade main rotor 110 for providing lift and forward or backward thrust during operation.

The at least one multi-blade main rotor 110 illustratively comprises a plurality of rotor blades 111, 112. The rotor blades 111, 112 are mounted at an associated rotor head 113 to a rotor shaft, which rotates in operation of the helicopter 100.

Illustratively, the fuselage 120 may comprise a fuselage underside 121 that is illustratively connected to a landing gear 115. The landing gear 115 is exemplarily embodied as a skid-type landing gear.

The fuselage 120 may define a nose region 130 that is arranged in front of the fuselage 120. The fuselage 120 also defines a tail boom 131, which is cut away and not shown in greater detail, for simplicity and clarity of the drawings.

If desired, the helicopter 100 may provide equipment 160 such as an external load device (e.g., a hoist 170) that is secured to the fuselage 120 with a beam 140. The beam 140 may be attached to a motor 116 via a power transmission system 150. The motor 116 may illustratively be arranged under the rotor head 113 and provide a rotational movement to the power transmission system 150.

Power transmission system 150 may transform the rotational movement of the motor 116 into a circular movement of the beam 140. An outward circular movement of the beam 140 (i.e., a circular movement of beam 140 that moves equipment 160 away from helicopter 100) may deploy the equipment 160, whereas an inward circular movement of the beam 140 (i.e., a circular movement of beam 140 that moves equipment 160 closer to helicopter 100) may retrieve the equipment 160.

Helicopter 100 may include a load carrying assembly 190 for carrying a load. The load carrying assembly 190 may include a cargo cable 175 and a load engaging system 200. Illustratively, the cargo cable 175 may have a first end 176 that is attachable to the hoist 170 and a second end 177 that is attached to the modular load carrying apparatus 200. If desired, the hoist 170 may deploy and retrieve the cargo cable 175.

Illustratively, modular load carrying apparatus 200 of FIGS. 2A to 4 may implement the load engaging system 200 of FIG. 1A that is removably attached to the second end 177 of the cargo cable 175. For example, the modular load carrying apparatus 200 may include a cap with an eyelet that is removably attached with a shackle to the second end 177 of the cargo cable 175.

FIG. 1B is a diagram of an illustrative rotary wing aircraft 100 with a load carrying assembly 190 that is attached to a cargo hook arrangement 180 located at the fuselage underside 121. Illustratively, cargo hook arrangement 180 may be removably installed in the subfloor region of rotary wing aircraft 100 between a floor structure and a bottom shell.

By way of example, cargo hook arrangement 180 is mounted between two longerons, and longerons are connected to floor structure and bottom shell. If desired, cargo hook arrangement 180 may be mounted between two transversal frame components instead.

A first end 176 of cargo cable 175 may be attachable to the cargo hook arrangement 180. For example, cargo hook arrangement 180 may include a winch and the first end 176 of cargo cable 175 may be attachable to the winch. When the first end of 176 of cargo cable 175 is attached to the winch, the winch may deploy cargo cable 175.

A second end 177 of cargo cable 175 may be removably attached to modular load carrying apparatus 200. For example, the modular load carrying apparatus 200 may include a cap with an eyelet that is removably attached with a shackle to the second end 177 of the cargo cable 175.

Illustratively, modular load carrying apparatus 200 of FIGS. 2A to 4 may implement the load engaging system 200 of FIG. 1B that is attached to second end 177 of cargo cable 175.

Figure 2A:
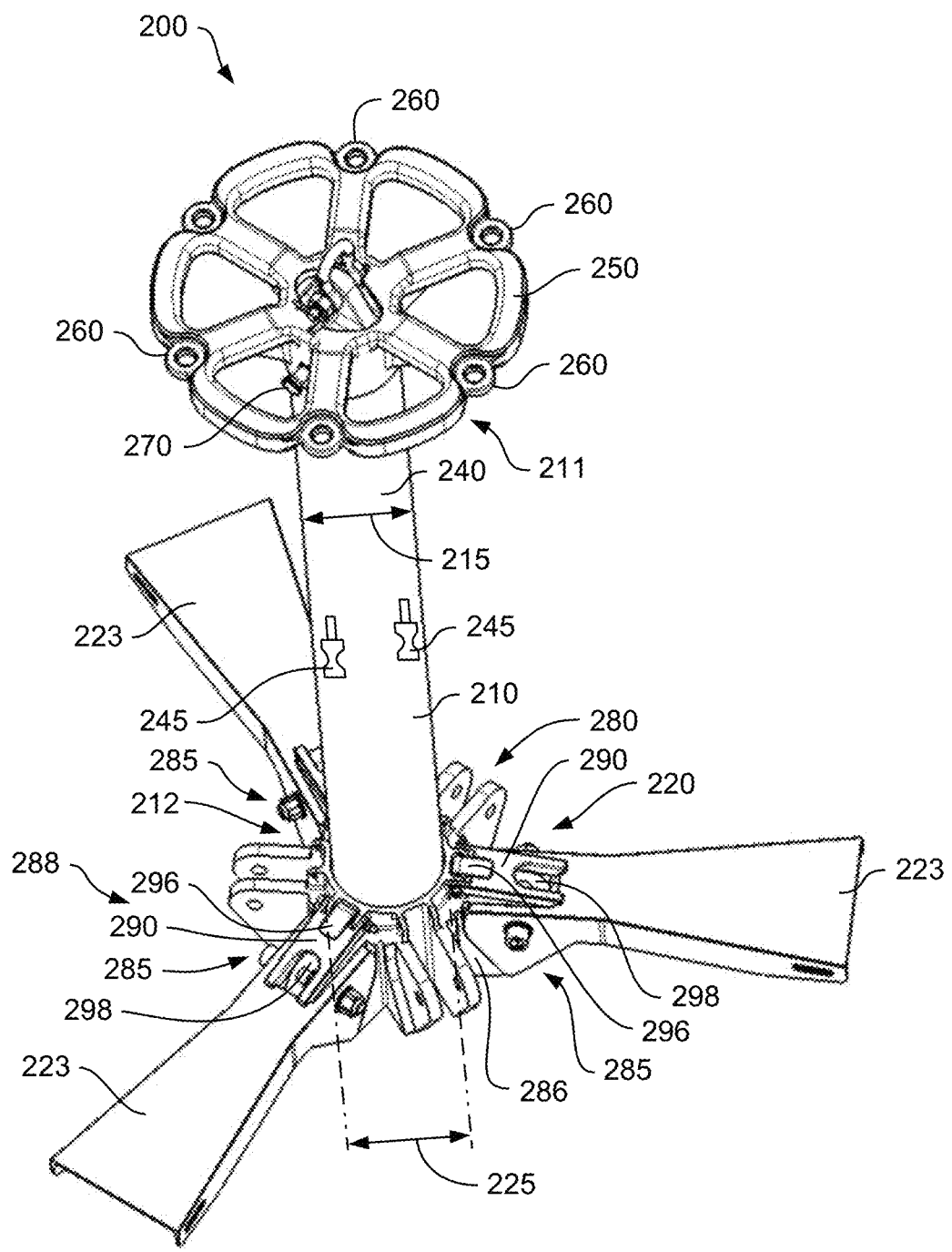
FIG. 2A is a diagram of an illustrative modular load carrying apparatus with a seat-type platform seen from above in accordance with some embodiments.
Figure 2B:
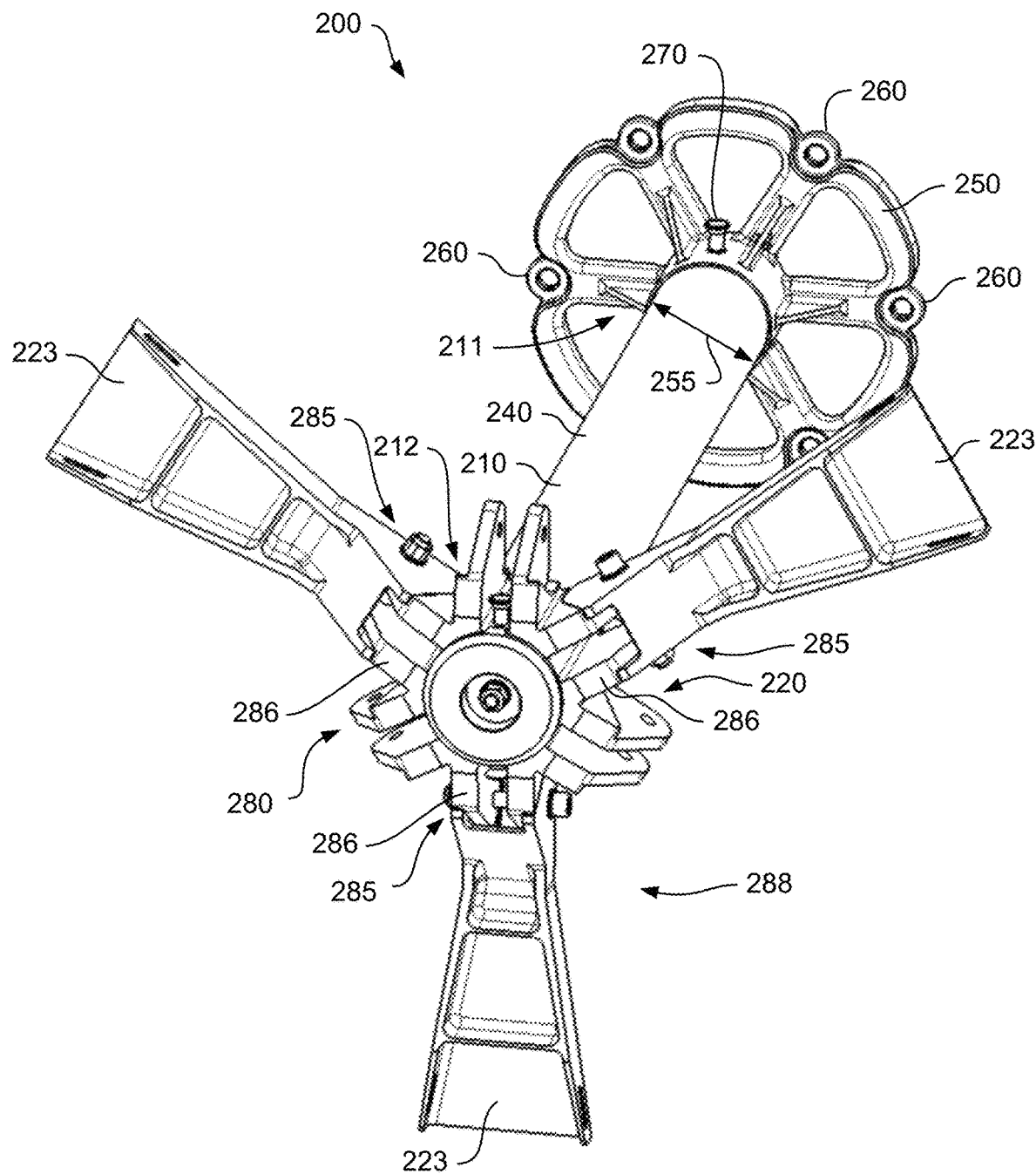
FIG. 2B is a diagram of the illustrative modular load carrying apparatus of FIG. 2A seen from below in accordance with some embodiments.

FIG. 2A is a diagram of an illustrative modular load carrying apparatus 200 with a seat-type platform 220 seen from above (i.e., as seen from the rotary wing aircraft 100 of FIG. 1A or FIG. 1B when the modular load carrying apparatus 200 is suspended from the rotary wing aircraft 100). FIG. 2B is a diagram of the illustrative modular load carrying apparatus of FIG. 2A seen from below (i.e., as seen from the ground when the rotary wing aircraft 100 of FIG. 1A or FIG. 1B with the suspended modular load carrying apparatus 200 is hovering over the point of view). The modular load carrying apparatus 200 may be used with the hoist 170 of FIG. 1A or with the cargo hook arrangement 180 of FIG. 1B.

Illustratively, the modular load carrying apparatus 200 may include a tube 210. The tube 210 may have the shape of a hollow cylindrical body. As an example, the tube 210 may be made from metal. As another example, the tube 210 may be made from fiber-reinforced plastics.

The tube 210 may have a predetermined outer diameter 215 and first and second axial ends 211, 212. If desired, removable upholstery 240 may be removably installed to cover the outside of the tube 210. For example, the removable upholstery 240 may have the shape of a tube, and the removable upholstery 240 may be slid over the first axial end 211 of the tube 210 to cover the outside of the tube 210.

Illustratively, the removable upholstery 240 may include a foam and/or gel cushion with a cover. The cover may be made of vinyl or a similar material. Preferably, the cover is at least tear-resistant.

By way of example, the modular load carrying apparatus 200 may further have first and second caps. The first cap may be located inside the tube 210 at the first axial end 211 and adapted for being connected with the rotary wing aircraft. For example, the first cap may provide an eyelet, and a shackle may attach the eyelet with a cargo cable (e.g., cargo cable 175 of FIG. 1A or FIG. 1B).

The second cap may be located inside the tube 210 at the second axial end 212. The second cap may have a protrusion that protrudes from the second axial end 212. The protrusion may have a predetermined outer diameter that is greater than the predetermined outer diameter of the tube 210. The second cap is described in more detail with reference to FIG. 4.

Illustratively, the modular load carrying apparatus 200 may include a carrier star 280. The carrier star 280 may be installed at the second axial end 212 of the tube 210.

The carrier star 280 may have a predetermined inner diameter 225 that is greater than the predetermined outer diameter 215 of the tube 210 and smaller than the predetermined outer diameter of the protrusion of the second cap. Thus, the carrier star 280 may be adapted for being slidable over the first axial end 211 of the tube 210 and restrained by the second cap.

By way of example, the carrier star 280 may include a plurality of docking devices 285. Each docking device 285 of the plurality of docking devices 285 is adapted for rotatably receiving at least one of a seat 223 or a carrier beam such that the at least one of a seat 223 or a carrier beam is folded against the tube 210 in a stowed position or unfolded from the tube 210 in a deployed position 288.

As an example, the at least one of a seat 223 or a carrier beam includes at least two seats 223. As shown in FIG. 2A or FIG. 2B, the at least one of a seat 223 or a carrier beam includes three seats 223. The at least two seats 223 may be rotatably attached to the plurality of docking devices 285 of the carrier star 280 to form a seat-type platform 220.

Each docking device 285 of the plurality of docking devices 285 may include a counter bracket 286. The counter bracket 286 may support the at least one of a seat 223 or a carrier beam in the deployed position 288. Thus, the counter bracket 286 prevents the at least one of a seat 223 or a carrier beam to be deployed by an angle that is greater than approximately 90° relative to the tube 210.

Illustratively, each docking device 285 of the plurality of docking devices 285 may include a carrier locking device 290. The carrier locking device 290 may lock the at least one of a seat 223 or a carrier beam in the deployed position 288. Thus, the carrier locking device 290 may prevent the at least one of a seat 223 or a carrier beam from rotating back from the deployed 288 position to the stowed position.

As a result, when at least three seats 223 are fully deployed, the seat-type platform 220 may be able to stand safely on the ground. For example, the seat-type platform 220 may stand on ground supports that are mounted on the lower side of each one of the seats 223.

Illustratively, the carrier locking device 290 may include a spring 296. The spring 296 may pre-load the carrier locking device 290 such that the carrier locking device 290 remains engaged with the at least one of a seat 223 or a carrier beam when the at least one of a seat 223 or a carrier beam is in the deployed position 288.

During the downward rotation of the at least one of a seat 223 or a carrier beam, the spring-loaded carrier locking device 290 may glide on the at least one of a seat 223 or a carrier beam and snap into a recess on the at least one of a seat 223 or a carrier beam when the at least one of a seat 223 or a carrier beam is fully unfolded.

By way of example, the carrier locking device 290 may include a handle 298. An operator may use the handle 298 to disengage the carrier locking device 290 from the at least one of a seat 223 or a carrier beam.

The carrier star 280 shown in FIG. 2A or FIG. 2B may receive up to six seats 223. However, a carrier star 280 that is able to receive more than six seats 223 may be used, if desired.

Preferably, the seats 223 are evenly distributed around the tube 210. As an example, three seats 223 may be installed with an angle of 120° between each other. As another example, four seats 223 may be installed with an angle of 90° between each other on a suitable carrier star 280. As yet another example, six seats 223 may be installed with an angle of 60° between each other.

If desired, the modular load carrying apparatus 200 may include at least one securing fastener 245 that is attached to the removable upholstery 240. The at least one securing fastener 245 may be adapted for securing the at least one of a seat 223 or a carrier beam in the stowed position.

For example, the at least one securing fastener 245 may include a quick release buckle such as a side release buckle, a push button release buckle, an end button release buckle, or another specialty release buckle that secures the at least one of a seat 223 or a carrier beam to the tube 210 in the stowed position.

Illustratively, the modular load carrying apparatus 200 of FIGS. 2A and 2B may include a removable cover 250. The removable cover 250 may be adapted for being slidable over the first axial end 211 of the tube 210. As an example, the removable cover 250 may have a predetermined inner diameter 255 that is greater than the predetermined outer diameter 215 of the tube 210.

By way of example, the removable cover 250 may include a plurality of safety lugs 260. The plurality of safety lugs 260 may be adapted for receiving means that secure a load on the seat-type platform 220. For example, a person sitting on a seat 223 may be attached to one or more of the safety lugs 260 by means of personal protective equipment.

As an example, a person sitting on a seat 223 may be attached with a harness, a safety line, and a snap hook or spring hook to one of the safety lugs 260. If desired, additional safety lugs may be provided on the upholstery 240 to ensure a redundant securing of each person.

Illustratively, the removable cover 250 may be secured to the tube 210 and/or to the first cap. For example, cover fasteners 270 may be adapted for securing the removable cover 250 to the tube 210 and to the first cap.

If desired, the cover fasteners 270 may include safety bolts, quick release pins, or any other fasteners that may be removed and installed without a tool. Preferably, at least two cover fasteners 270 and not more than four cover fasteners secure the removable cover 250 to the tube 210 and to the first cap.

Figure 3:
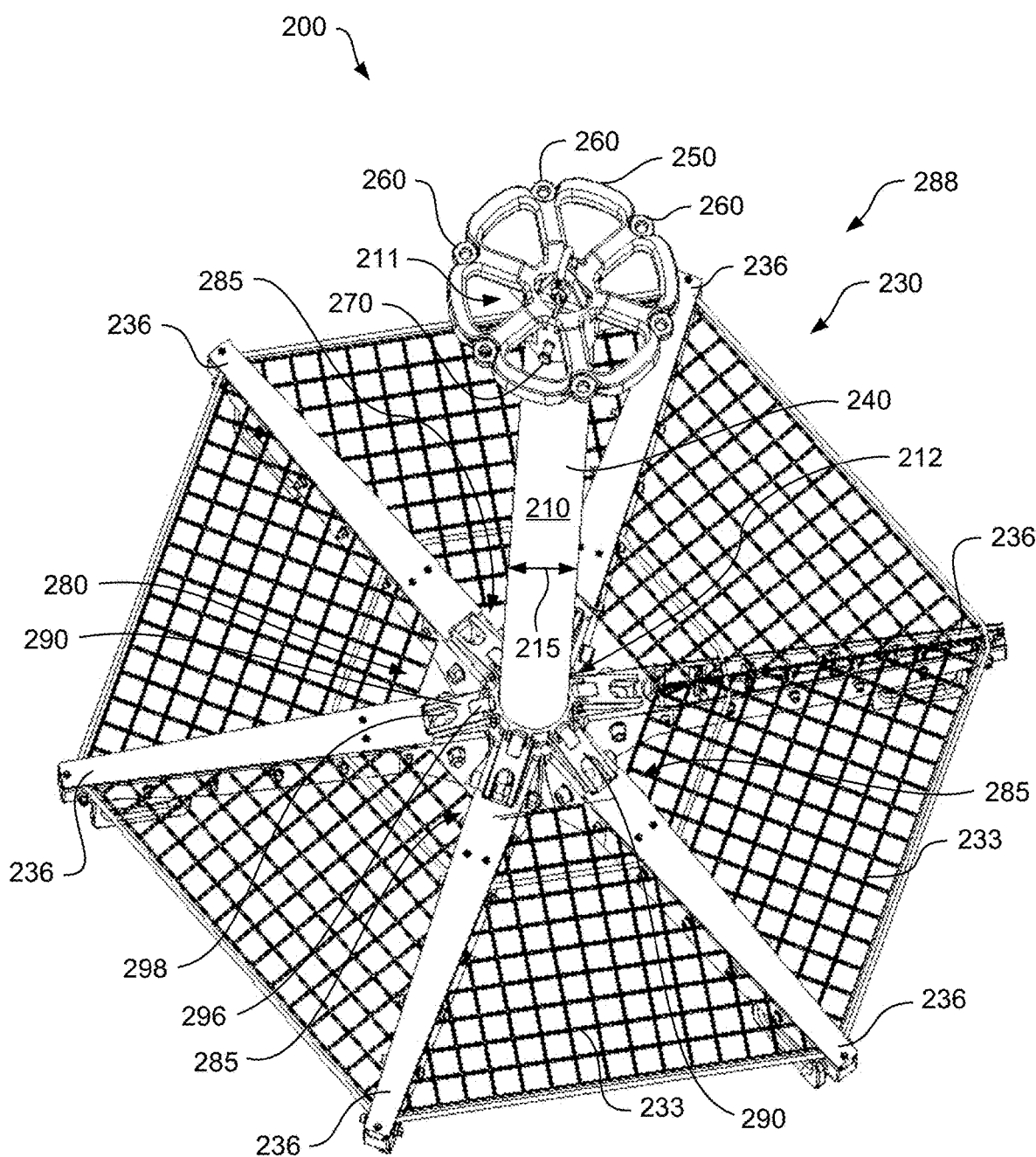
FIG. 3 is a diagram of an illustrative modular load carrying apparatus with a net-type platform in accordance with some embodiments.

FIG. 3 is a diagram of an illustrative modular load carrying apparatus 200 with a removable net-type platform 230. The modular load carrying apparatus 200 may be used with the hoist 170 of FIG. 1A or with the cargo hook arrangement 180 of FIG. 1B.

Illustratively, the modular load carrying apparatus 200 may include a tube 210. The tube 210 may have a predetermined outer diameter 215 and first and second axial ends 211, 212. If desired, removable upholstery 240 may be removably installed to cover the outside of the tube 210.

Illustratively, the removable upholstery 240 may include a foam and/or gel cushion with a cover. The cover may be made of vinyl or a similar material. Preferably, the cover is at least tear-resistant.

By way of example, the modular load carrying apparatus 200 may further have first and second caps. The first cap may be located inside the tube 210 at the first axial end 211 and adapted for being connected with the rotary wing aircraft. For example, the first cap may provide an eyelet, and a shackle may attach the eyelet with a cargo cable (e.g., cargo cable 175 of FIG. 1A or FIG. 1B).

The second cap may be located inside the tube 210 at the second axial end 212. Illustratively, the second cap may have a protrusion that protrudes from the second axial end 212. The protrusion may have a predetermined outer diameter that is greater than the predetermined outer diameter of the tube 210. The second cap is described in more detail with reference to FIG. 4.

Illustratively, the modular load carrying apparatus 200 may include a carrier star 280. The carrier star 280 may be installed at the second axial end 212 of the tube 210.

The carrier star 280 may have a predetermined inner diameter that is greater than the predetermined outer diameter 215 of the tube 210 and smaller than the predetermined outer diameter of the protrusion of the second cap. Thus, the carrier star 280 may be adapted for being slidable over the first axial end 211 of the tube 210 and restrained by the second cap.

By way of example, the carrier star 280 may include a plurality of docking devices 285. Each docking device 285 of the plurality of docking devices 285 is adapted for rotatably receiving at least one of a seat (e.g., seat 223 of FIG. 2A or FIG. 2B) or a carrier beam 236 such that the at least one of a seat or a carrier beam 236 is folded against the tube 210 in a stowed position or unfolded from the tube 210 in a deployed position 288.

As an example, the at least one of a seat or a carrier beam 236 may include at least three carrier beams 236 and nets 233. As shown in FIG. 3, the at least one of a seat or a carrier beam 236 includes six carrier beams 236 and nets 233.

The at least three carrier beams 236 may be rotatably attached to the plurality of docking devices 285 of the carrier star 280. The nets 233 may be spanned between the at least three carrier beams 236 to form a net-type platform 230. When two neighbouring carrier beams 236 are in the fully deployed position 288, the net 233 may be stretched between the carrier beams 236.

Illustratively, several net holder bolts may fix a net 233 to a carrier beam 236. For this purpose, the net holder bolts may be passed through downwardly oriented loops that are installed at the middle plane of each carrier beam 236. The net holder bolts may be fed through drill holes on the outer flanges of the carrier beam 236 and secured with nuts.

On top of each carrier beam 236, a carrier cover may be attached. If desired, the carrier cover may be attached with a grip tape on its upper surface in order to guaranty a safe stand for the transport of people.

Illustratively, each docking device 285 of the plurality of docking devices 285 may include a carrier locking device 290. The carrier locking device 290 may lock the at least one of a seat or a carrier beam 236 in the deployed position 288. Thus, the carrier locking device 290 may prevent the at least one of a seat or a carrier beam 236 from rotating back from the deployed 288 position to the stowed position.

As a result, when all carrier beams 236 of the at least three carrier beams 236 are fully deployed, the net-type platform 230 may be able to stand safely on the ground. For example, the net-type platform 230 may stand on ground supports that are mounted on the lower side of each one of the carrier beams 236.

Illustratively, the carrier locking device 290 may include a spring 296. The spring 296 may pre-load the carrier locking device 290 such that the carrier locking device 290 remains engaged with the at least one of a seat or a carrier beam 236 when the at least one of a seat or a carrier beam 236 is in the deployed position 288.

By way of example, the carrier locking device 290 may include a handle 298. An operator may use the handle 298 to disengage carrier locking device 290 from the at least one of a seat or a carrier beam 236. For example, the operator may use the handle 298 to exert a force against the spring 296 such that the carrier locking device 290 may be disengaged from a recess in the at least one of a seat or a carrier beam 236.

The carrier star 280 shown in FIG. 3 may receive up to six carrier beams 236. However, a carrier star 280 that is able to receive more than six carrier beams 236 may be used, if desired.

Preferably, the carrier beams 236 are evenly distributed around the tube 210. As an example, three carrier beams 236 may be installed with an angle of 120° between each other. As another example, six carrier beams 236 may be installed with an angle of 60° between each other.

By way of example, each one of the at least three carrier beams 236 may be foldable. In the stowed position, which is sometimes also referred to as a folded position when the stowing involves folding of the carrier beams 236, the carrier beams 236 may be secured by a fastener that prevents the carrier beams 236 from returning from the stowed position, to a deployed position 288, which is sometimes also referred to as an unfolded position.

For example, a fastener with a quick release buckle such as a side release buckle, a push button release buckle, an end button release buckle, or another specialty release buckle may secure a carrier beam 236 to the tube 210 in the stowed position. Such a fastener may be attached to the removable upholstery 240, if desired.

Thus, the modular load carrying apparatus 200 with the net-type platform 230 may be adapted for transporting a predetermined number of people and their equipment at the same time. As an example, the modular load carrying apparatus 200 with the net-type platform 230 may be adapted for transporting three people and equipment at the same time. As another example, the modular load carrying apparatus 200 with the net-type platform 230 may be adapted for transporting six people and equipment at the same time.

Illustratively, the modular load carrying apparatus 200 with the net-type platform 230 may include a removable cover 250. The removable cover 250 may be adapted for being slidable over the first axial end 211 of the tube 210. Thus, the removable cover 250 may have a predetermined inner diameter that is greater than the predetermined outer diameter 215 of the tube 210.

By way of example, the removable cover 250 may include a plurality of safety lugs 260. The plurality of safety lugs 260 may be adapted for receiving means that secure a load on the net-type platform 230. For example, a person sitting on a net 233 or standing on a carrier beam 236 and/or their equipment may be attached to one or more of the safety lugs 260 by means of personal protective equipment.

As an example, a person sitting on a net 233 may be attached with a harness, a safety line, and a snap hook or spring hook to one of the safety lugs 260. If desired, additional safety lugs may be provided on the upholstery 240 to ensure a redundant securing of each person and/or their equipment.

Illustratively, the removable cover 250 may be secured to the tube 210 and/or to the first cap. For example, cover fasteners 270 may be adapted for securing the removable cover 250 to the tube 210 and to the first cap.

If desired, the cover fasteners 270 may include safety bolts, quick release pins, or any other fasteners that may be removed and installed without a tool. Preferably, at least two cover fasteners 270 and not more than four cover fasteners secure the removable cover 250 to the tube 210 and to the first cap.

Figure 4:
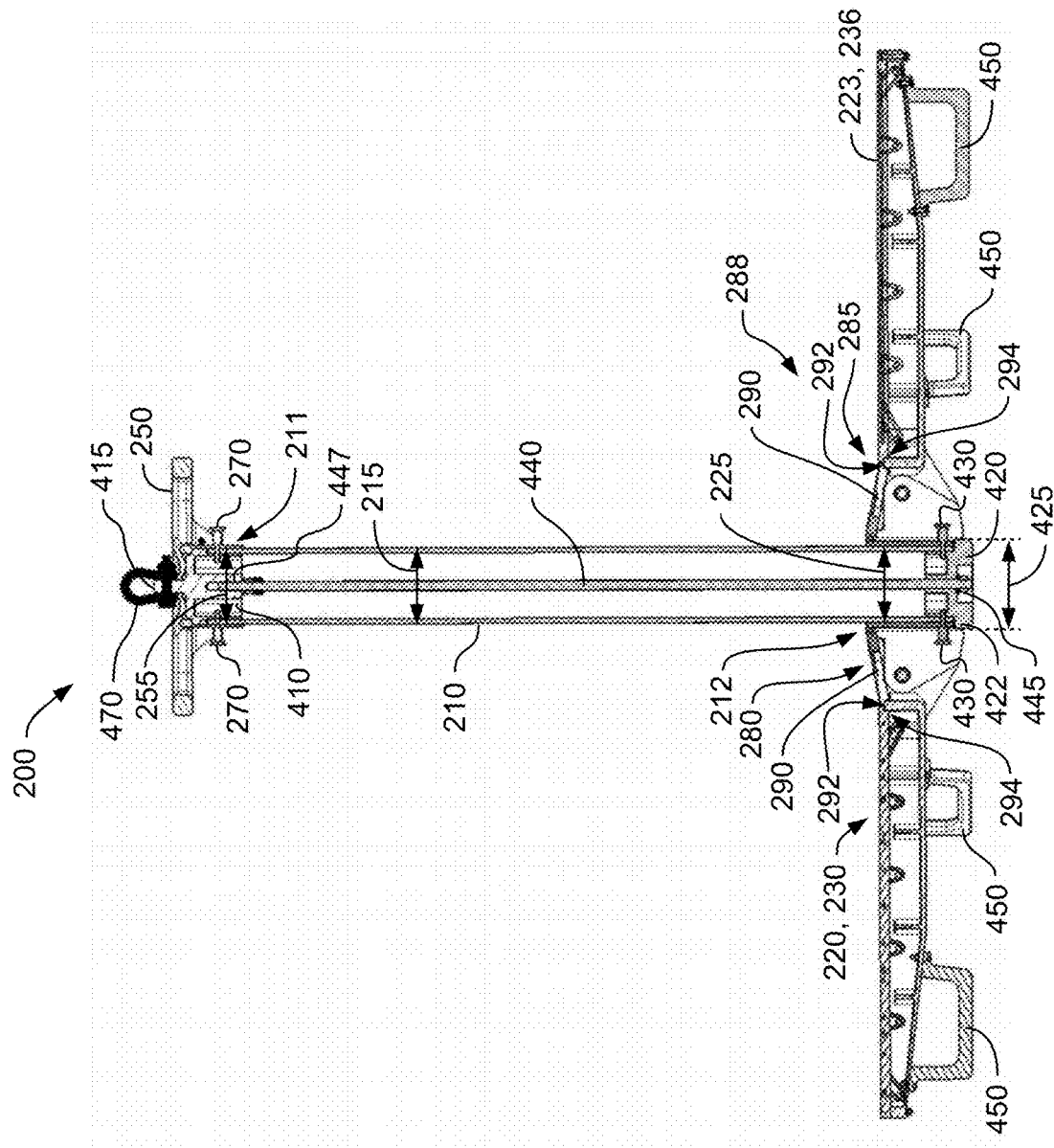
FIG. 4 is a cross sectional diagram of an illustrative modular load carrying apparatus in accordance with some embodiments.

FIG. 4 is a cross sectional diagram of an illustrative modular load carrying apparatus 200 for a rotary wing aircraft (e.g., rotary wing aircraft 100 of FIG. 1A or FIG. 1B).

Illustratively, the modular load carrying apparatus 200 may include a tube 210. The tube 210 may have a first predetermined outer diameter 215 and first and second axial ends 211, 212.

If desired, the tube 210 may be adapted for serving as a flotation device. For example, the tube 210 may be sealed off watertight at both ends. Thus, the tube 210 may provide enough buoyancy for the entire modular load carrying apparatus 200 when the modular load carrying apparatus 200 is emerged in water. If desired, the length and diameter of the tube 210 may be dimension to achieve a predetermined buoyancy.

Alternatively, the modular load carrying apparatus 200 may include additional flotation devices. The additional flotation devices may be attached to the tube 210 at the second axial end 212, if desired.

As shown in FIG. 4, the modular load carrying apparatus 200 may include a first cap 410 that is located inside the tube 210 at the first axial end 211. The first cap 410 may be adapted for being connected with the rotary wing aircraft. For example, the first cap 410 may provide an eyelet 415, and a shackle 470 may attach the eyelet 415 with a cargo cable of the rotary wing aircraft.

Illustratively, the modular load carrying apparatus 200 may include a removable cover 250. The removable cover 250 may have a second predetermined inner diameter 255 that is greater than the first predetermined outer diameter 215. Thus, the removable cover 250 may be adapted for being slidable over the first axial end 211 of the tube 210.

If desired, cover fasteners 270 may be adapted for securing the removable cover 250 to the tube 210 and to the first cap 410. The cover fasteners 270 may include safety bolts, quick release pins, or any other fasteners that may be removed and installed without a tool. Preferably, the cover fasteners 270 may secure the removable cover 250 to the tube 210 and to the first cap 410 on opposite sides of the tube 210.

As shown in FIG. 4, the modular load carrying apparatus 200 may include a second cap 420. The second cap 420 may be located inside the tube 210 at the second axial end 212.

The second cap 420 may have a protrusion 422 that protrudes from the second axial end 212. The protrusion 422 may have a second predetermined outer diameter 425 that is greater than the first predetermined outer diameter 215 (i.e., the outer diameter of the tube 210).

By way of example, the modular load carrying apparatus 200 may include a carrier star 280. The carrier star 280 may be installed at the second axial end 212 of the tube 210.

Illustratively, the modular load carrying apparatus 200 may include platform fasteners 430. The platform fasteners 430 may be adapted for securing the carrier star 280 to the tube 210 and to the second cap 420.

The platform fasteners 430 may include safety bolts, quick release pins, or any other fasteners that may be removed and installed without a tool. Preferably, at least two platform fasteners 430 and not more than four platform fasteners 430 secure the carrier star 280 to the tube 210 and to the second cap 420.

By way of example, the carrier star 280 may include a plurality of docking devices 285. Each docking device 285 of the plurality of docking devices 285 may be adapted for rotatably receiving at least one of a seat 223 or a carrier beam 236 such that the at least one of a seat 223 or a carrier beam 236 is folded against the tube 210 in a stowed position or unfolded from the tube 210 in a deployed position 288.

Illustratively, each docking device 285 of the plurality of docking device 285 may include a carrier locking device 290. The carrier locking device 290 may lock the at least one of a seat 223 or a carrier beam 236 in the deployed position 288.

For example, the carrier locking device 290 may include a recess 292. The recess 292 may form fit a locking edge 294 of the at least one of a seat 223 or a carrier beam 236.

Illustratively, the modular load carrying apparatus 200 may be equipped with a seat-type platform 220 as shown in FIG. 2A and FIG. 2B when the docking devices 285 receive seats 223. If desired, the modular load carrying apparatus 200 may be equipped with a net-type platform 230 as shown in FIG. 3 when the docking devices 285 receive carrier beams 236 and nets 233.

Preferably, a first carrier star 280 may be equipped with seats 223 to form a seat-type platform 220, a second carrier star 280 may be equipped carrier beams 236 and nets 233 to form a net-type platform 230, and the seat-type and net-type platforms 220, 230 may be interchangeably installable on the tube 210.

When all seats 223 or all carrier beams 236 are unfolded the modular load carrying apparatus 200 may be able to stand safely on the ground. For example, each seat 223 and each carrier beam 236 may include a ground support 450 that is mounted on the lower side of the respective seat 223 or carrier beam 236.

The at least one of a seat 223 or a carrier beam 236 is adapted for standing on the ground support 450 when the at least one of a seat 223 or a carrier beam 236 is in the deployed position 288. Preferably, the ground supports 450 that are mounted to the seats 223 and/or the carrier beams 236 may together form a level plane, when the seats 223 or carrier beams 236 in the deployed position 288, and the seat-type platform 220 and the net-type platform 230 may both be adapted for standing safely on the ground using the level plane formed by the ground supports 450.

By way of example, the modular load carrying apparatus 200 may include a tension rod 440. The tension rod 440 may be spanned between the first cap 410 and the second cap 420. For example, the tension rod 440 may be arranged inside the tube 210 between the first and second caps 410, 420.

Illustratively, the tension rod 440 may be threaded at both ends. For example, the tension rod 440 may have outer threads at both ends. If desired, the first cap 410 may include a threaded hole 447 into which one threaded end of the tension rod 440 is screwed.

The second cap 420 may have a bore hole. The tension rod 440 may be put through the bore hole, and a tension rod fastener 445 may be secured onto the other threaded end of the tension rod 440, thereby spanning the tension rod 440 between the first and second caps 410, 420 as shown in FIG. 4.

Illustratively, the tension rod fastener 445 may include a nut that is screwed onto the other threaded end of the tension rod 440. Preferably, the tension rod fastener 445 includes an additional washer. If desired, the tension rod fastener 445 may include securing means such as a safety pin for preventing the nut from loosening and/or accidentally falling off the tension rod 440.

Thus, the tube 210 is clamped between the first and second caps 410, 420 by means of the tension rod 440. The pretension of the tension rod 440 respectively the clamp force of the tube 210 may be adjusted by the tension rod fastener 445, if desired.

The tension rod 440 may transfer tension loads from the carrier star 280 via the second cap 420 towards the first cap 410. The first cap 410 may further transfer the tension loads via the eyelet 415 to the shackle 470 and from there through a cargo cable (e.g., cargo cable 175 of FIG. 1A or 1B) to a hoist (e.g., hoist 170 of FIG. 1A) or to a cargo hook arrangement (e.g., cargo hook arrangement 180 of FIG. 1B).

Figure 5A:
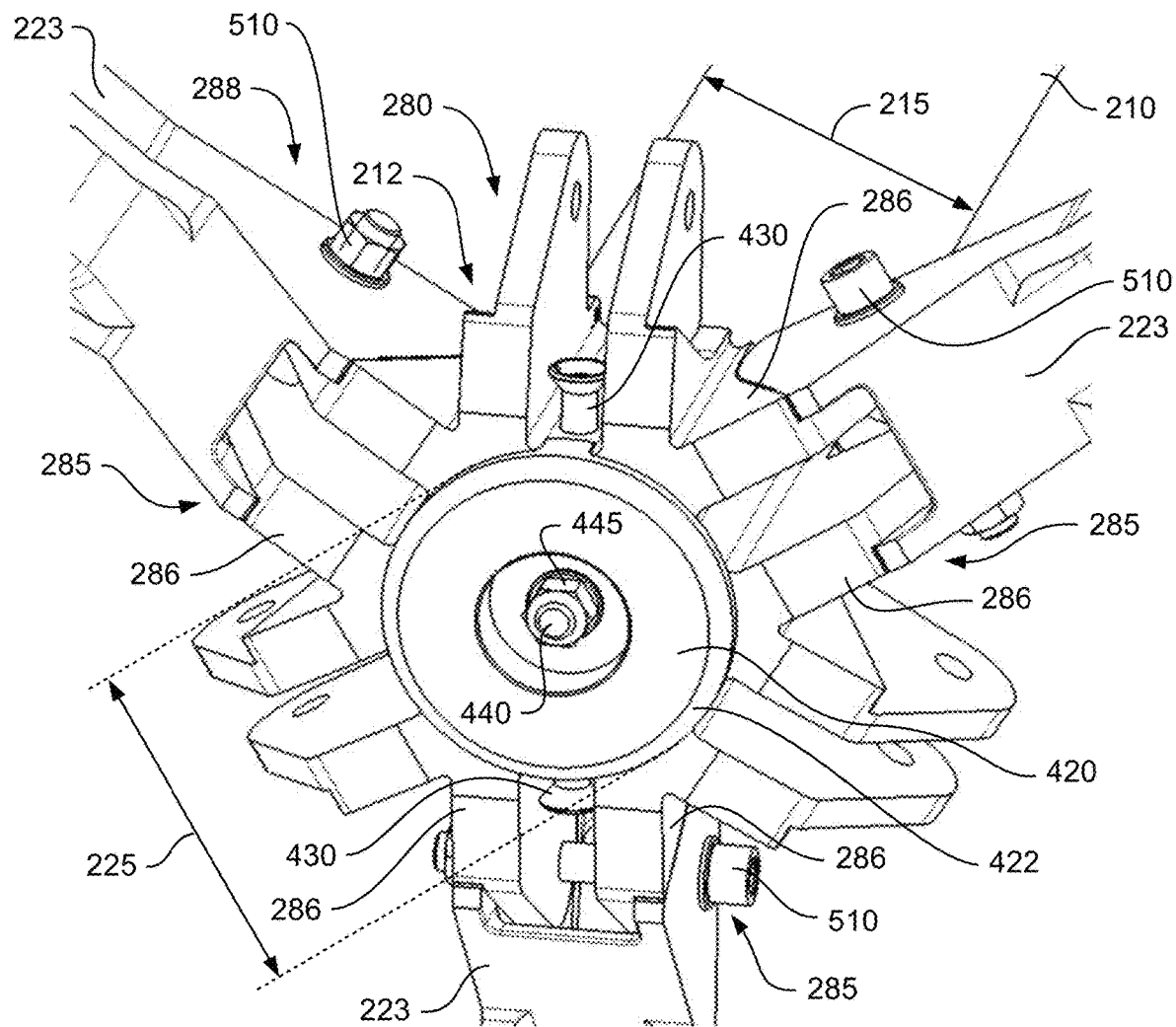
FIG. 5A is a diagram of an illustrative carrier star seen from below in accordance with some embodiments.

FIG. 5A is a diagram of an illustrative carrier star 280 seen from below (i.e., as seen from the ground when the rotary wing aircraft 100 of FIG. 1A or FIG. 1B with the suspended modular load carrying apparatus 200 is hovering over the point of view).

As shown in FIG. 5A, the tension rod 440 is put through a bore hole in the second cap 420, and a tension rod fastener 445, exemplarily embodied by a nut 445, is screwed onto the threaded end of the tension rod 440.

Illustratively, the second cap 420 may have a protrusion that protrudes from the second axial end 212. The protrusion 422 may have a predetermined outer diameter that is greater than the predetermined outer diameter 215 of the tube 210.

By way of example, the carrier star 280 is shown installed at the second axial end 212 of the tube 210. If desired, the carrier star 280 may have a predetermined inner diameter 225 that is greater than the predetermined outer diameter 215 of the tube 210 such that the carrier star 280 can slide over the tube 210. The predetermined inner diameter 225 of the carrier star 280 may be smaller than the predetermined outer diameter of the protrusion 422 such that the carrier star 280 is secured at the second axial end 212 of the tube 210.

Illustratively, the modular load carrying apparatus 200 may include platform fasteners 430. The platform fasteners 430 may be adapted for securing the carrier star 280 to the tube 210 and to the second cap 420.

The carrier star 280 may include a plurality of docking devices 285. Each docking device 285 of the plurality of docking devices 285 may be adapted for rotatably receiving at least one of a seat 223 or a carrier beam such that the at least one of a seat 223 or a carrier beam is folded against the tube 210 in a stowed position or unfolded from the tube 210 in a deployed position 288.

As shown in FIG. 5A, the carrier star 280 includes six docking devices 285, and three of the six docking devices 285 rotatably receive a respective seat 223. The respective seats 223 may be rotatably attached to the docking devices 285 using docking device fasteners 510.

For example, a docking device fastener 510 may include a bolt and nut that rotatably attaches a seat 223 to a docking device 285. If desired, the docking device fastener 510 may include a bearing that facilitates a rotational movement of the seat 223 relative to the docking device 285.

Illustratively, each docking device 285 may include a counter bracket 286. The counter bracket 286 may support the seat 223 in the deployed position 288.

Figure 5B:
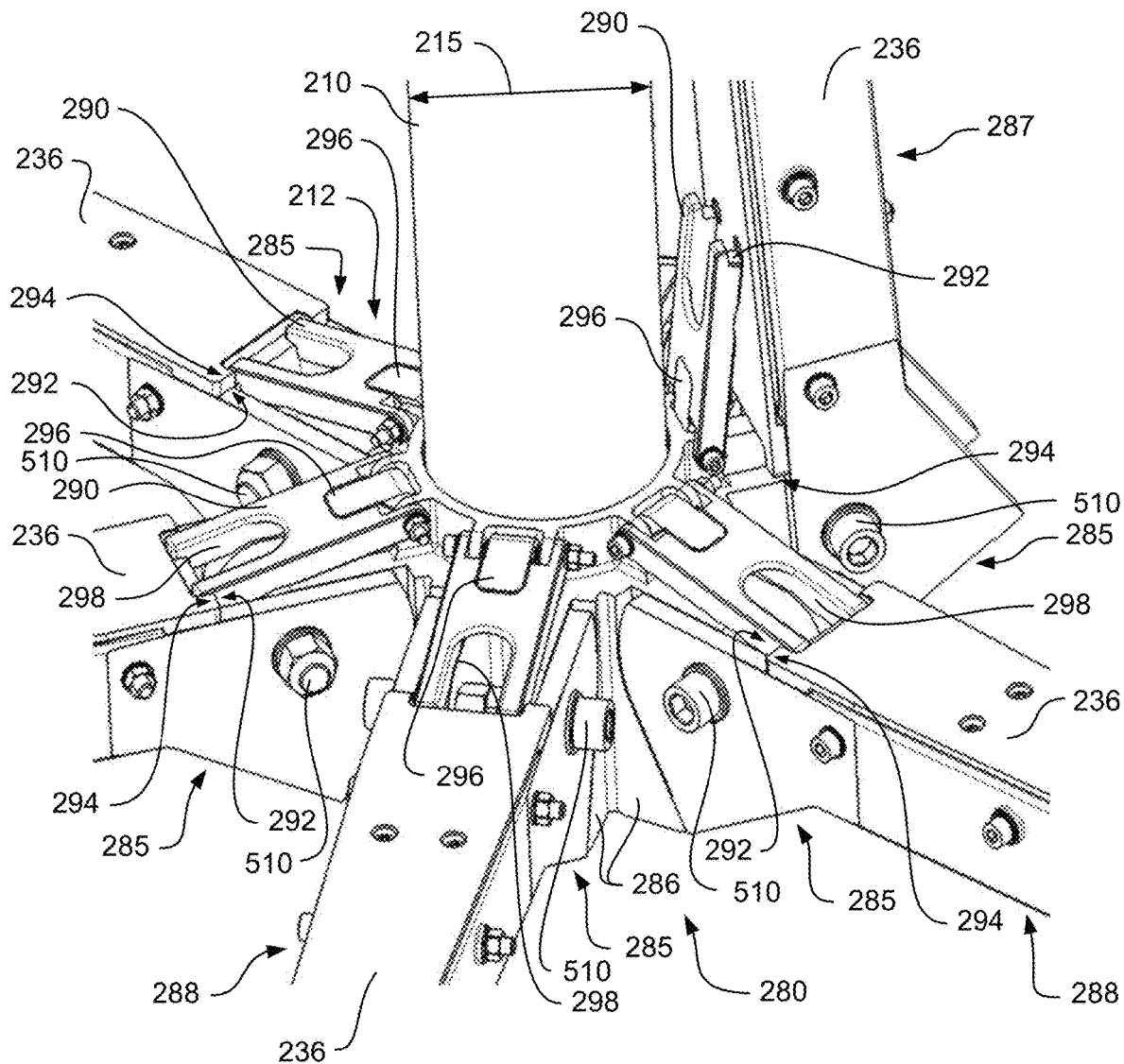
FIG. 5B is a diagram of an illustrative carrier star seen from above in accordance with some embodiments.

FIG. 5B is a diagram of an illustrative carrier star 280 seen from above (i.e., as seen from the rotary wing aircraft 100 of FIG. 1A or FIG. 1B when the modular load carrying apparatus 200 is suspended from the rotary wing aircraft 100).

By way of example, the carrier star 280 may be installed at the second axial end 212 of the tube 210 and include a plurality of docking devices 285. Each docking device 285 of the plurality of docking devices 285 may be adapted for rotatably receiving at least one of a seat or a carrier beam 236 such that the at least one of a seat or a carrier beam 236 is folded against the tube 210 in a stowed position 287 or unfolded from the tube 210 in a deployed position 288.

Illustratively, the carrier star 280 of FIG. 5B may include six docking devices 285 that each rotatably receives a respective carrier beam 236. The respective carrier beams 236 may be rotatably attached to the docking devices 285 using docking device fasteners 510.

For example, a docking device fastener 510 may include a bolt and nut that rotatably attaches a carrier beam 236 to a docking device 285. If desired, the docking device fastener 510 may include a bearing that facilitates a rotational movement of the carrier beam 236 relative to the docking device 285.

By way of example, each one of the at least three carrier beams 236 may be foldable. In the stowed position, which is sometimes also referred to as a folded position when the stowing involves folding of the carrier beams 236, the carrier beams 236 may be secured by a fastener that prevents the carrier beams 236 from returning from the stowed position 287 to a deployed position 288, which is sometimes also referred to as an unfolded position.

For example, a fastener with a quick release buckle such as a side release buckle, a push button release buckle, an end button release buckle, or another specialty release buckle may secure a carrier beam 236 to the tube 210 in the stowed position 287. Such a fastener may be attached to the removable upholstery, if desired.

When moving a carrier beam 236 from the stowed position 287 to a deployed position 288, the carrier beam 236 may be rotated downward by approximately 90° from its stowed position 287 to its deployed position 288 around a carrier rotation axis that is defined by the docking device fastener 510, until the carrier beam 236 is approximately orthogonal relative to the tube 210.

Illustratively, each docking device 285 may include a counter bracket 286. The counter bracket 286 may support the carrier beam 236 in the deployed position 288.

By way of example, each docking device 285 may include a carrier locking device 290. The carrier locking device 290 may lock the at least one of a seat or a carrier beam 236 in the deployed position 288. For example, the carrier locking device 290 may include a recess 292 that form fits a locking edge 294 of the at least one of a seat or a carrier beam 236.

As shown in FIG. 5B, each docking device 285 includes a carrier locking device 290 with a recess 292 that locks a carrier beam 236 in the deployed position 288 by engaging with a locking edge 294 of the carrier beam 236.

By way of example, the carrier locking device 290 may include a spring 296. During the downward rotation of the carrier beam 236, the spring-loaded carrier locking device 290 may glide on the carrier beam 236, and the recess 292 of the carrier locking device 290 may engage with the locking edge 294 of the carrier beam 236 when the carrier beam 236 is fully unfolded.

The spring 296 may pre-load the carrier locking device 290 such that the recess 292 remains engaged with the locking edge of the carrier beam 236 when the carrier beam 236 is in the deployed position 288.

Illustratively, the carrier locking device 290 may include a handle 298. The handle 298 may be adapted for disengaging the recess 292 from the locking edge 294 of the carrier beam 236.

For example, an operator may use the handle 298 to exert a force against the spring 296 of the carrier locking device 290, thereby disengaging the recess 292 from the locking edge 294 of the carrier beam 236.

Figure 6:
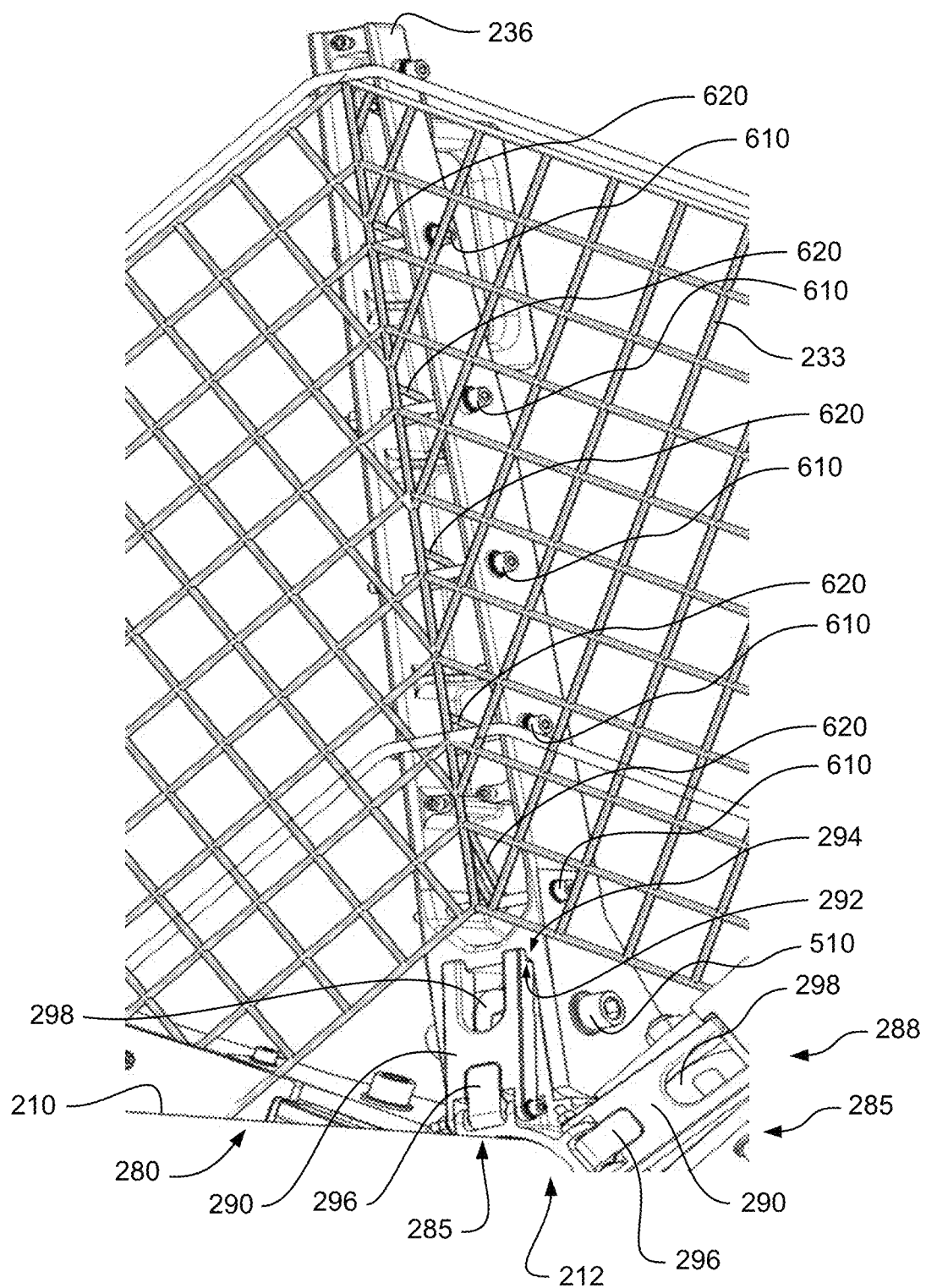
FIG. 6 is a diagram of an illustrative carrier beam with a net attached to a carrier star in accordance with some embodiments.

Illustratively, the net-type platform 230 may include nets 233 between the at least three carrier beams 236. FIG. 6 is a diagram of an illustrative carrier beam 236 with a net 233. The carrier beam 236 is shown to be attached to a carrier star 280 that is installed on a tube 210.

The spanned net 233 may be fixed to the carrier beam 236 by net fasteners 610. For this purpose, the net 233 may include, at the middle plane of each carrier beam 236, downwardly oriented net loops 620 through which the net fasteners 610 are passed. The net fasteners 610 may be fed through drill holes on the two outer flanges of the carrier beam 236. For example, the net fasteners 610 may include bolts that are secured with nuts.

It should be noted that the above-described embodiments are merely described for illustration purposes, but not in order to restrict the present disclosure thereto. Instead, multiple modifications and variations of the presented embodiments are possible and should, therefore, also be considered as being part of the disclosure.

For example, hoist 170 of FIG. 1A and cargo hook arrangement 180 of FIG. 1B are shown to include a winch and the first end 176 of cargo cable 175 may be attachable to the winch. However, the winch may be part of the load carrying assembly 190 instead, and hoist 170 as well as cargo hook arrangement 180 may be adapted to receive the winch.

Furthermore, the carrier star 280 of FIG. 5A is shown equipped with seats 223, while the carrier star 280 of FIG. 5B is shown equipped with carrier beams 236. However, the carrier star 280 of FIG. 5A may be equipped with carrier beams 236 and the carrier star 280 of FIG. 5B with seats 223, if desired.

In addition, a carrier star 280 may be equipped with both, seats 223 and carrier beams 236 with nets 233 at the same time, if desired. As an example, a carrier star 280 may be equipped with a seat 233 and three carrier beams 236 with a net 233 spanned between the three carrier beams 236. As another example, a carrier star 280 may be equipped with two seats 233 and two carrier beams 236 with a net 233 spanned between the two carrier beams 236.

Moreover, the net 233 of the net-type platform of FIG. 6 has net loops 620 that are fixed to the carrier beam 236 by net fasteners 610. However, instead of net fasteners 610 and net loops 620, the net-type platform may have carrier beams 236 with bars, and hooks or shackles may attach the net 233 to the bars of the carrier beams 236, if desired.

REFERENCE LIST 100 rotary wing aircraft
110 multi-blade main rotor
111, 112 rotor blades 113 rotor head
115 landing gear
116 motor
120 fuselage
121 fuselage underside
130 nose region
131 tail boom
140 beam
150 power transmission system
160 equipment
170 hoist
175 cargo cable
176 first end of cargo cable
177 second end of cargo cable
180 cargo hook arrangement
190 load carrying assembly
200 modular load carrying apparatus
210 tube
211, 212 axial end
215 outer diameter
220 removable platform
223 seat
225 inner diameter
230 removable platform
233 net
236 carrier beam
240 removable upholstery
245 securing fastener
250 removable cover
255 inner diameter
260 safety lug
270 cover fastener
280 carrier star
285 docking device
286 counter bracket
287 stowed position
288 deployed position
290 carrier locking device
292 recess
294 locking edge
296 spring
298 handle
410 cap
415 eyelet
420 cap
422 protrusion
425 outer diameter
430 platform fastener
440 tension rod
445 tension rod fastener
447 threaded hole
470 shackle
510 docking device fastener
610 net fastener
620 net loop

What is claimed is:

1. A modular load carrying apparatus for a rotary wing aircraft, comprising:
   a tube that has a first predetermined outer diameter and first and second axial ends;
   a first cap that is located inside the tube at the first axial end and adapted for being connected with the rotary wing aircraft;
   a second cap that is located inside the tube at the second axial end and comprises a protrusion that protrudes from the second axial end and has a second predetermined outer diameter that is greater than the first predetermined outer diameter;
   a carrier star that is installed at the second axial end of the tube and comprises a plurality of docking devices, wherein each docking device of the plurality of docking devices is adapted for rotatably receiving at least one of a seat or a carrier beam such that the at least one of a seat or a carrier beam is folded against the tube in a stowed position or unfolded from the tube in a deployed position; and
   a tension rod that is spanned between the first cap and the second cap and transfers tension loads from the carrier star via the second cap towards the first cap.

2. The modular load carrying apparatus of claim 1 wherein the carrier star has a first predetermined inner diameter that is greater than the first predetermined outer diameter and smaller than the second predetermined outer diameter such that the carrier star is adapted for being slidable over the first axial end of the tube and restrained by the second cap.

3. The modular load carrying apparatus of claim 1 further comprising:
   removable upholstery that covers the outside of the tube.

4. The modular load carrying apparatus of claim 3 further comprising:
   at least one securing fastener that is attached to the removable upholstery and adapted for securing the at least one of a seat or a carrier beam in the stowed position.

5. The modular load carrying apparatus of claim 1 further comprising:
   platform fasteners that are adapted for securing the carrier star to the tube and to the second cap.

6. The modular load carrying apparatus of claim 1 wherein each docking device of the plurality of docking devices further comprises:
   a counter bracket that supports the at least one of a seat or a carrier beam in the deployed position.

7. The modular load carrying apparatus of claim 1 wherein each docking device of the plurality of docking devices further comprises:
   a carrier locking device that locks the at least one of a seat or a carrier beam in the deployed position.

8. The modular load carrying apparatus of claim 7 wherein the carrier locking device further comprises:
   a recess that form fits a locking edge of the at least one of a seat or a carrier beam.

9. The modular load carrying apparatus of claim 8 wherein the carrier locking device further comprises:
   a spring that pre-loads the carrier locking device such that the recess remains engaged with the locking edge of the at least one of a seat or a carrier beam when the at least one of a seat or a carrier beam is in the deployed position.

10. The modular load carrying apparatus of claim 8 wherein the carrier locking device further comprises:
    a handle for disengaging the recess from the locking edge of the at least one of a seat or a carrier beam.

11. The modular load carrying apparatus of claim 1 wherein each one of the at least one of a seat or a carrier beam further comprises:
    a ground support, wherein the at least one of a seat or a carrier beam is adapted for standing on the ground support when the at least one of a seat or a carrier beam is in the deployed position.

12. The modular load carrying apparatus of claim 1 wherein the at least one of a seat or a carrier beam further comprises:
- at least two seats that are rotatably attached to the plurality of docking devices of the carrier star to form a seat-type platform.

13. The modular load carrying apparatus of claim 1 wherein the at least one of a seat or a carrier beam further comprises:
- at least three carrier beams that are rotatably attached to the plurality of docking devices of the carrier star; and
- nets that are spanned between the at least three carrier beams to form a net-type platform.

14. The modular load carrying apparatus of claim 1 further comprising:
- a removable cover that is installed at the first axial end of the tube and comprises a plurality of safety lugs that are adapted for securing a load.

15. A rotary wing aircraft, comprising:
- at least one of a hoist or a cargo hook arrangement; and
- the modular load carrying apparatus of claim 1 wherein the first cap is removably attached to the at least one of a hoist or a cargo hook arrangement.

* * * * *